(12) United States Patent
Zhang (10) Patent No.: US 7,978,919 B2
(45) Date of Patent: *Jul. 12, 2011

(54) METHOD AND APPARATUS FOR ENCODING AND DECODING IN INTER MODE BASED ON MULTIPLE SCANNING

(75) Inventor: Zhi-ming Zhang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1658 days.

This patent is subject to a terminal disclaimer.

(21) Appl. No.: 11/219,798

(22) Filed: Sep. 7, 2005

(65) Prior Publication Data

US 2006/0067400 A1 Mar. 30, 2006

(30) Foreign Application Priority Data

Sep. 30, 2004 (KR) .................. 10-2004-0077724

(51) Int. Cl.
 *G06K 9/36* (2006.01)
 *H04N 11/04* (2006.01)
 *G06K 9/46* (2006.01)

(52) U.S. Cl. .................. 382/232; 375/240.03

(58) Field of Classification Search .................. 382/162, 382/164, 173, 232, 233, 236, 246, 250, 251; 375/240.03, 240.12, 240.16, 240.2, 240.23, 375/240.24, 240.26; 341/65, 67
See application file for complete search history.

(56) References Cited

U.S. PATENT DOCUMENTS

| | | | |
|---|---|---|---|
| 6,188,725 B1 * | 2/2001 | Sugiyama | 375/240 |
| 6,426,975 B1 * | 7/2002 | Nishi et al. | 375/240.13 |
| 6,483,928 B1 * | 11/2002 | Bagni et al. | 382/107 |
| 6,697,427 B1 * | 2/2004 | Kurak et al. | 375/240.03 |
| 6,985,635 B2 * | 1/2006 | Chen et al. | 382/250 |
| 7,119,723 B1 * | 10/2006 | Nagori | 341/67 |
| 7,129,862 B1 * | 10/2006 | Shirdhonkar et al. | 341/67 |
| 7,471,724 B2 * | 12/2008 | Lee | 375/240.12 |
| 7,711,196 B2 * | 5/2010 | Kim et al. | 382/233 |
| 2003/0202588 A1 | 10/2003 | Yu et al. | |
| 2004/0001546 A1 | 1/2004 | Tourapis et al. | |
| 2004/0057523 A1 | 3/2004 | Koto et al. | |
| 2005/0036549 A1 * | 2/2005 | He et al. | 375/240.12 |
| 2006/0067399 A1 * | 3/2006 | Zhang | 375/240.03 |
| 2006/0067400 A1 * | 3/2006 | Zhang | 375/240.03 |

FOREIGN PATENT DOCUMENTS

| | | |
|---|---|---|
| EP | 1 120 976 | 8/2001 |
| EP | 1 241 893 | 3/2002 |
| EP | 1 349 396 | 10/2003 |
| JP | 2002-330443 | 11/2002 |
| JP | 2003-299103 | 10/2003 |
| KR | 2004-0035139 | 4/2004 |

OTHER PUBLICATIONS

U.S. Appl. No. 11/191,931, filed Jul. 29, 2005, Zhi-Ming Zhang, Samsung Electronics Co., LTD. Final Office Action dated Nov. 8, 2010 for related U.S. Appl. No. 11/191,931.
Office Action dated May 19, 2010 for related U.S. Appl. No. 11/191,931.

* cited by examiner

*Primary Examiner* — Amir Alavi
(74) *Attorney, Agent, or Firm* — Staas & Halsey LLP

(57) ABSTRACT

Provided are a method and apparatus for encoding and decoding in an inter mode based on a multiple scanning through which efficiency of the inter mode is improved by using a spatial relationship within a frame and obtaining estimation information from numerous references. The method includes dividing an input image into basic encoding/decoding units including predetermined sized blocks, scanning at least one of the basic encoding/decoding units, determining whether references for motion estimation of a current basic encoding/decoding unit can be used as references to encode/decode the current basic encoding/decoding unit, and selectively encoding/decoding the current basic encoding/decoding unit according to a result of the determination. A decoded previous frame or blocks decoded before the final scan of a current frame is used the references for motion estimation.

25 Claims, 12 Drawing Sheets

ENCODED/DECODED BLOCKS AT 1st SCAN

FIG. 12B

ENCODED/DECODED BLOCKS AT 2nd SCAN

FIG. 12C

ENCODED/DECODED BLOCKS AT Nth SCAN

METHOD AND APPARATUS FOR ENCODING AND DECODING IN INTER MODE BASED ON MULTIPLE SCANNING

CROSS-REFERENCE TO RELATED APPLICATIONS

This application claims the benefit of Korean Patent Application No. 10-2004-0077724, filed on Sep. 30, 2004 in the Korean Intellectual Property Office, the disclosure of which is incorporated herein by reference.

BACKGROUND OF THE INVENTION

1. Field of the Invention

The present invention relates to a method and apparatus for encoding and decoding in an inter mode, and more particularly, to a method and apparatus for encoding and decoding in an inter mode based on multiple scanning in which an encoding and decoding order is set according to whether references for motion estimation can be used as a reference for encoding/decoding.

2. Description of the Related Art

Recently, codecs of Moving Picture Experts Group (MPEG)-2, MPEG-4, and H.263 use discrete cosine transform (DCT) conversion as a reference in an inter mode.

In an inter mode of H.264, a top macroblock (MB) and/or a left MB is/are used as a reference.

Figure 1:
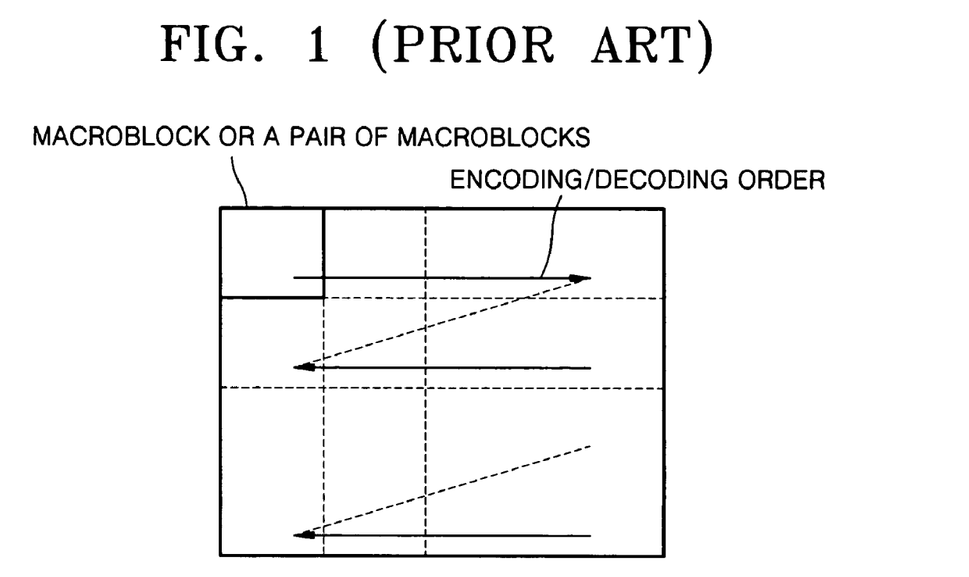
FIG. 1 is a view illustrating an encoding/decoding order in Moving Picture Experts Group (MPEG)-2, MPEG-4, H.263, and H.264.

Referring to FIG. 1, it can be seen that an encoding/decoding order in MPEG-2, MPEG-4, H.263, and H.264 is from left to right, and from top to bottom.

Figure 2:
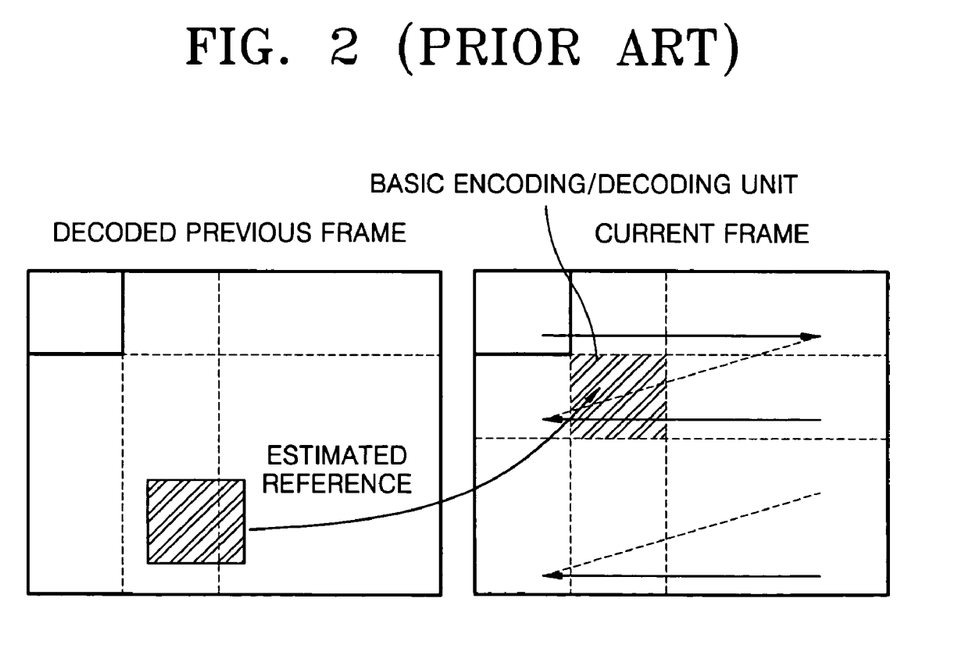
FIG. 2 is a view illustrating an encoding/decoding order in an inter mode of MPEG-2, MPEG-4, H.263, and H.264.

FIG. 2 is a view of an encoding/decoding order in an inter mode of MPEG-2, MPEG-4, and H.263.

First, the encoding order of MPEG-2, MPEG-4, and H.263 is as follows:
(1) A current block A is obtained.
(2) Motion is estimated from a previously decoded image to obtain an estimation block.
(3) An interpolation matrix C is obtained from the estimation block.
(4) After calculating the difference between the block A and the interpolation matrix C, DCT conversion is performed: DCT(A-C)
(5) Quantization is performed: Matrix B=Quantization (DCT(A-C))
(6) Coefficients of matrix B (i.e., DCT coefficients) are zigzag scanned, and variable length code (VLC) encoding is performed.

The decoding order of MPEG-2, MPEG-4, and H.263 is as follows:
(1) A Matrix A is obtained by VLC decoding and zigzag scanning.
(2) Dequantization is performed: Matrix B=Dequantization(A)
(3) Inverse DCT (IDCT) is performed: IDCT(B)
(4) Motion estimation is performed to obtain an interpolation matrix C from the previous decoded reference frame.
(5) A decoded 8×8 block is obtained by adding the result of IDCT and the obtained interpolation matrix C: IDCT(B)+C.

Figure 3:
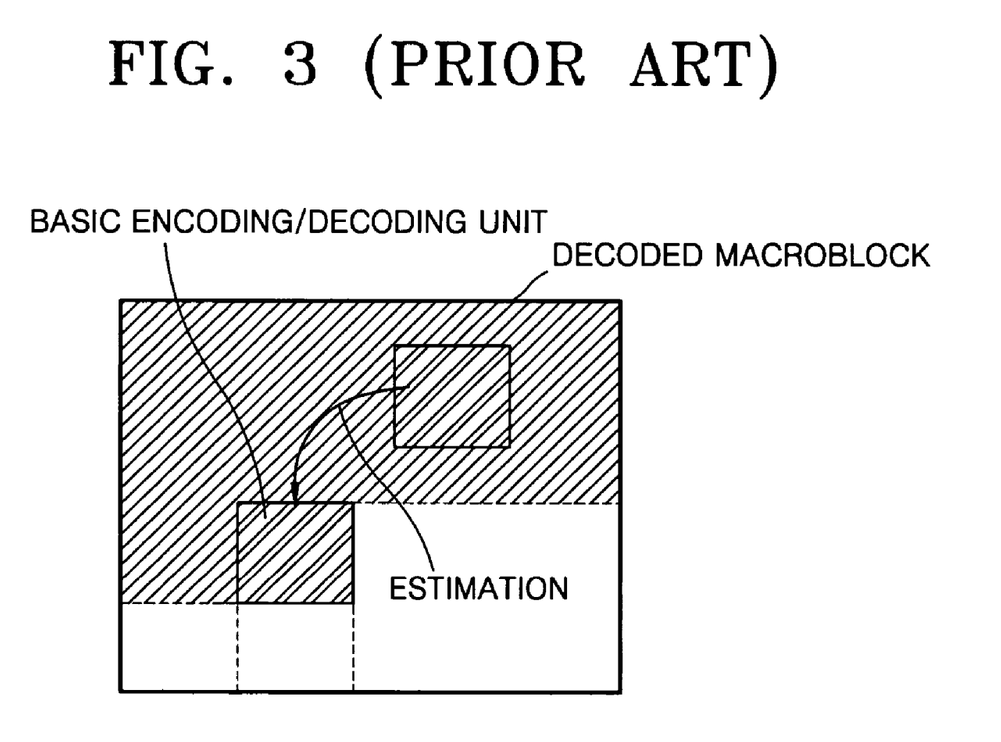
FIG. 3 is a view illustrating an encoding/decoding order in an inter mode of a SI-slice of H.264.

FIG. 3 is a view of an encoding/decoding order in an inter mode of H.264 switching I (SI) pictures.

In H.264 SI, the inter mode is based on DCT conversion of the difference of 4×4 (or 16×16) blocks and spatial estimation of itself. First, the encoding order of H.264 is as follows:
(1) A current block A is obtained.
(2) Motion estimation is performed using decoded MBs inside a current frame.
(3) An interpolation matrix C (reference) is obtained from the motion estimation block.
(4) A difference between block A and interpolation matrix C is DCT converted: DCT(A-C)
(5) Quantization is performed: B=Quantization (DCT(A-C))
(6) Matrix B is zigzag scanned, and VLC encoding is performed.

The decoding order of H.264 Si is as follows:
(1) Matrix A is obtained by VLC decoding and zigzag scanning.
(2) Dequantization is performed: B=Dequantization(A)
(3) IDCT is performed: IDCT(B)
(4) Motion estimation is performed to obtain an interpolation matrix C (reference) from a previously decoded reference frame.
(5) A decoded 8×8 block is obtained by adding a result of IDCT and the obtained interpolation matrix C: IDCT(B)+C.

As seen with reference to FIGS. 2 and 3, the number of modes for basic encoding and decoding unit is limited in the conventional art.

In the case of an inter mode, information can be obtained from only a previously decoded frame or decoded MBs inside the current frame (such decoded MBs are always on the top or left of the current frame) as a reference for motion estimation, and thus, spatial relationship is strictly limited.

Therefore, if a MB has an error (caused by an encoder or transmission) included therein, the left MB in such slice or the frame is also lost and a low peak signal-to-noise occurs due to error transmission.

SUMMARY OF THE INVENTION

The present invention provides a method of encoding and decoding in an inter mode based on multiple scanning so as to improve the efficiency of the inter mode by using a spatial relationship within a frame and obtaining estimation information from numerous references.

According to an aspect of the present invention, there is provided a method of encoding in an inter mode based on multiple scanning. The method includes dividing an input image into basic encoding units including predetermined sized blocks, scanning at least one of the basic encoding units, determining whether references for motion estimation of a current basic encoding unit can be used as references to encode the current basic encoding unit, and selectively encoding the current basic encoding unit according to a result of the determination.

The scanning of the at least one of the basic encoding units and up to the selective encoding of the current basic encoding unit, is repeated until encoding of the input image is completed.

The selective encoding of the current basic encoding unit includes encoding the current basic encoding unit based on the references if the references for motion estimation can be used as the references to encode the current basic encoding unit, and not encoding the current basic encoding unit and moving on to a next basic encoding unit that is to be encoded if the references for motion estimation cannot be used as the references to encode the current basic encoding unit.

The encoding of the current basic encoding unit based on the references includes obtaining an estimation matrix from the references for motion estimation, performing discrete cosine transform (DCT) on a difference between the current encoding unit that is to be encoded and the obtained estimation matrix, obtaining DCT conversion coefficients by performing dequantization on a result of DCT, and encoding the current basic encoding unit using the DCT conversion coefficients.

The DCT conversion coefficients are scanned in a zigzag fashion and encoded using a variable length coding (VLC) method. A decoded previous frame or blocks decoded before a final scanning of a current frame is used as the references for motion estimation. The basic encoding units including the predetermined sized blocks are macroblocks or M×N matrixes.

According to another aspect of the present invention, there is provided a method of decoding in an inter mode based on multiple scanning. The method includes dividing an input image into basic decoding units including predetermined sized blocks scanning at least one of the basic decoding units determining whether references for motion estimation of a current basic decoding unit can be used as references to encode the current basic decoding unit and selectively decoding the current basic decoding unit according to a result of the determination.

The scanning of the at least one of the basic decoding units and up to the selective decoding of the current basic decoding unit is repeated until decoding of the input image is completed.

The selective decoding of the current basic decoding unit includes decoding the current basic decoding unit based on the references if the references for motion estimation can be used as the references to decode the current basic decoding unit, and not decoding the current basic decoding unit and moving on to a next basic decoding unit that is to be decoded if the references for motion estimation cannot be used as the references to decode the current basic decoding unit.

The decoding of the current basic decoding unit based on the references includes obtaining the basic decoding units through decoding and scanning the input image, dequantizing the obtained basic decoding units, obtaining references for motion estimation by performing IDCT (inverse DCT) on a result of the dequantization, obtaining an estimation matrix from the obtained references for motion estimation, and adding the result of the IDCT and the estimation matrix to obtain a decoded block.

The basic decoding units are decoded using a VLC method and obtained using zigzag scanning in the obtaining of the basic decoding units. A decoded previous frame or block decoded before a final scanning of a current frame is used as the references for motion estimation. The basic decoding units including the predetermined sized blocks are macroblocks or M×N matrixes.

According to another aspect of the present invention, there is provided an encoder in an inter mode based on multiple scanning. The encoder includes a scanning unit for dividing an input image into basic encoding units including predetermined sized blocks and scanning at least one of the basic encoding units an encoding determination unit for determining whether references for motion estimation of the basic encoding units scanned by the scanning unit can be used as references to encode the basic encoding units an encoding unit for selectively encoding the basic encoding units according to a result of the determination of the encoding determination unit and a controlling unit for controlling operations of the scanning unit, the encoding determination unit, and the encoding unit.

The encoding unit includes an estimation matrix generating unit to obtain an estimation matrix from the references for motion estimation, a difference calculating unit to calculate a difference between a basic encoding unit selected by the encoding determination unit and the estimation matrix obtained from the estimation matrix generating unit, a DCT unit to perform DCT on an output of the difference calculating unit, a quantization unit to quantize a result output from the DCT unit, and a VLC encoding unit to scan and perform VLC encoding on a result of quantization.

The controlling unit operates the scanning unit, the encoding determination unit, and the encoding unit until encoding of the input image is completed.

A decoded previous frame or blocks decoded before a final scanning of a current frame is used as the references for motion estimation. The basic encoding units including the predetermined sized blocks are macroblocks or M×N matrixes.

According to another aspect of the present invention, there is provided a decoder in an inter mode based on a multiple scanning. The decoder includes a scanning unit for dividing an input image into basic decoding units including predetermined sized blocks and scanning at least one of the basic decoding units a decoding determination unit for determining whether references for motion estimation of the basic decoding units scanned by the scanning unit can be used as references to decode the basic decoding units a decoding unit for selectively decoding the basic decoding units according to a result of the determination of the decoding determination unit and a controlling unit for controlling operations of the scanning unit, the decoding determination unit, and the decoding unit.

The decoding unit includes a VLC decoding unit to obtain the basic decoding units through VLC decoding and scanning the input image, a dequantinizer to dequantize the obtained basic decoding units, an IDCT unit to perform IDCT to obtain the references for motion estimation, an estimation matrix generating unit to obtain an estimation matrix from the references for motion estimation, and an adder to add an output of the IDCT unit and the estimation matrix.

The controlling unit operates the scanning unit, the decoding determination unit, and the decoding unit until decoding of the input image is completed. A decoded previous frame or blocks decoded before a final scanning of a current frame is used as the references for motion estimation. The basic decoding units including the predetermined sized blocks are macroblocks or M×N matrixes.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
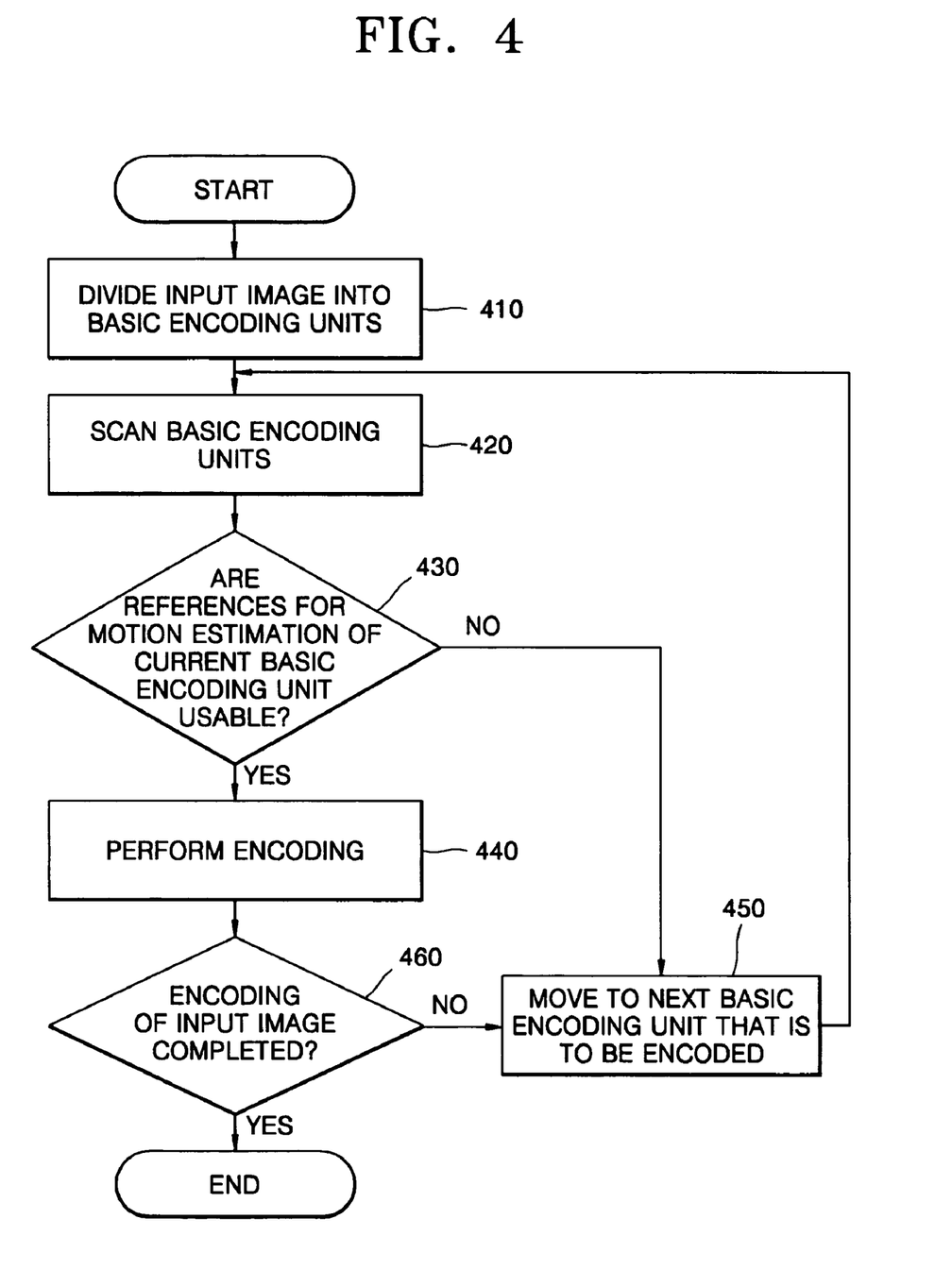
FIG. 4 is a flow chart illustrating an encoding order in an inter mode based on a multi-scan according to an embodiment of the present invention.

In FIG. 4, an encoding order in an inter mode based on a multiple scanning according to an embodiment of the present invention will be described.

First, in operation 410, an input image is divided into basic encoding units composed of predetermined sized blocks. Here, the basic encoding units composed of the predetermined sized blocks may be 16×16 macroblocks (MBs) or another MBs of M×N form (M>1, N>1, wherein M and N are integers).

Next, in operation 420, at least one of the basic encoding units is scanned. In the present embodiment, a raster scan, which is a general scanning method, is adopted. The raster scan scans from left to right, and from top to bottom.

Then, in operation 430, it is determined whether references for motion estimation of the current basic encoding unit can be used as references to encode the current basic encoding unit.

The references for motion estimation use blocks that are decoded before the final scan of a decoded previous frame or the current frame.

In operation 430, if the result of the determination indicates that the references for motion estimation of the current basic encoding unit can be used as the references to encode the current basic encoding unit, encoding is performed in operation 440.

In operation 450, if the references for motion estimation of the current basic encoding unit cannot be used as the reference to encode the current basic encoding unit, encoding is not performed on the current basic encoding unit and the process moves on to the next basic encoding unit. Then, the process moves on to operation 420 which scans the basic encoding units. The encoding process of operation 440 will be described in more detail with reference to FIG. 5.

After performing encoding in operation 440, it is determined whether encoding of the input image is completed in operation 460.

If the determination result indicates that the encoding of the input image is completed, the encoding process is terminated, but if the encoding of the input image is not completed, the process moves on to operation 450 and then starts the process from operation 420.

Figure 5:
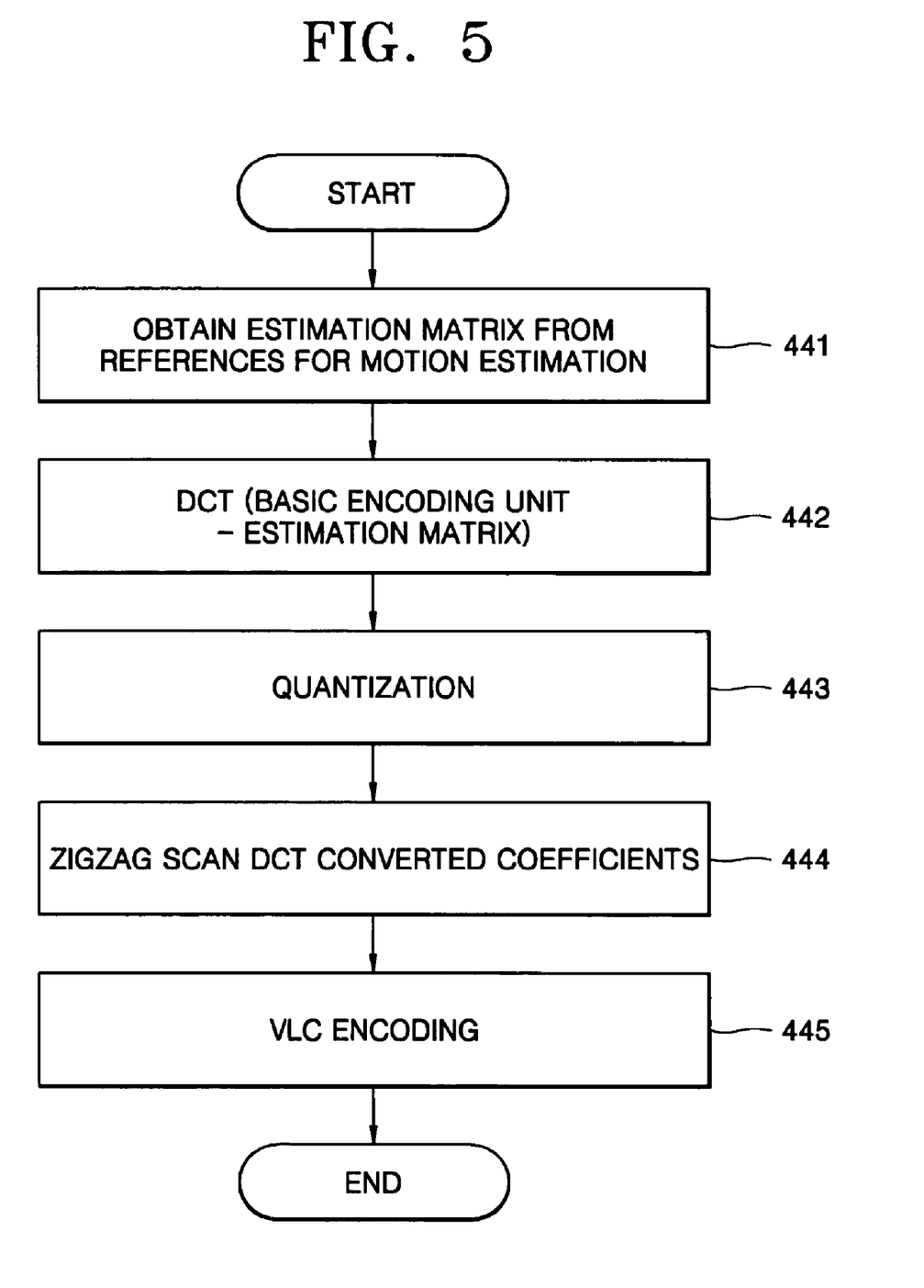
FIG. 5 is a detailed flow chart illustrating an encoding operation described in FIG. 4.

FIG. 5 is a detailed flow chart illustrating the encoding operation 440 described in FIG. 4.

In operation 441, an estimation matrix is obtained from the references for motion estimation of which re-construction is completed. As described-above, the references for motion estimation use the blocks that are decoded before the final scan of the decoded previous frame or the current frame.

Then, in operation 442, after calculating the differences between the basic encoding units and the estimation matrix, the difference values are discrete cosine transform (DCT) converted.

In operation 443, DCT converted coefficients are obtained by quantizing the DCT converted results obtained in operation 442.

After zigzag scanning the obtained DCT dequantized coefficients in operation 444, variable length code (VLC) encoding is performed in operation 445.

Figure 6:
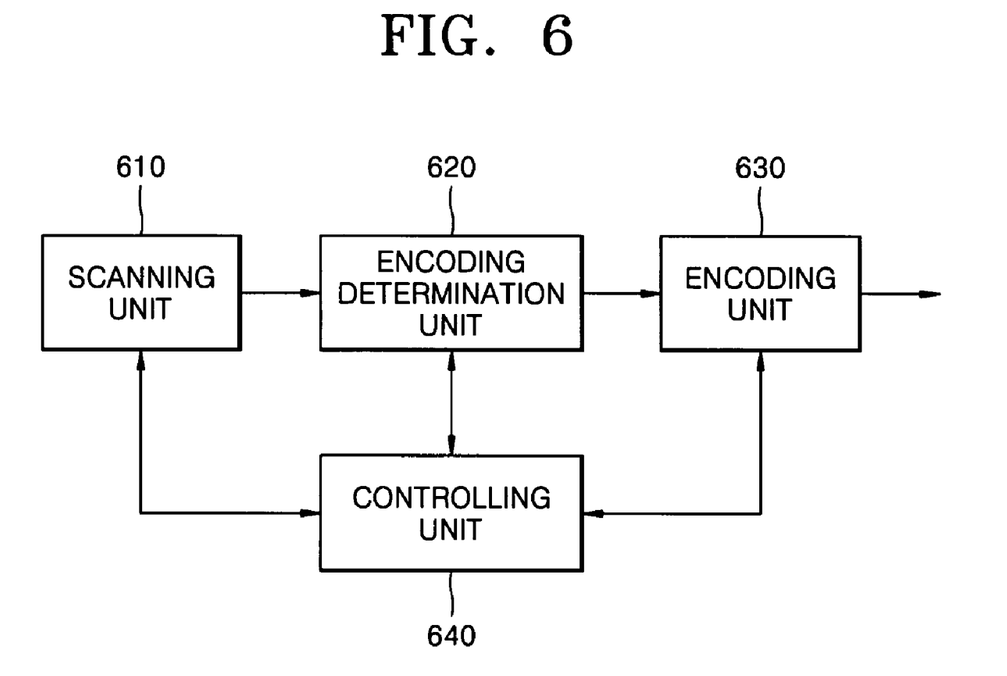
FIG. 6 is a schematic diagram of an encoder to perform encoding in the inter mode based on the multi-scan according to an embodiment of the present invention.

FIG. 6 is a schematic diagram of an encoder to perform encoding in the inter mode based on the multi-scan method according to an embodiment of the present invention.

The encoder illustrated in FIG. 6 includes a scanning unit 610, an encoding determination unit 620, an encoding unit 630, and a controlling unit 640. The scanning unit 610 divides an input image into basic encoding units composed of predetermined sized blocks and scans at least one of the basic encoding units. The encoding determination unit 620 determines whether references for motion estimation of the basic encoding units scanned by the scanning unit 620 can be used as references to encode the basic encoding units. The encoding unit 630 selectively encodes the basic encoding units according to the determination result of the encoding determination unit 620, and the controlling unit 640 controls the operations of the scanning unit 610, the encoding determination unit 620, and the encoding unit 630. Also, the controlling unit 640 operates the scanning unit 610, the encoding determination unit 620, and the encoding unit 630 until encoding of the input image is completed.

Figure 7:
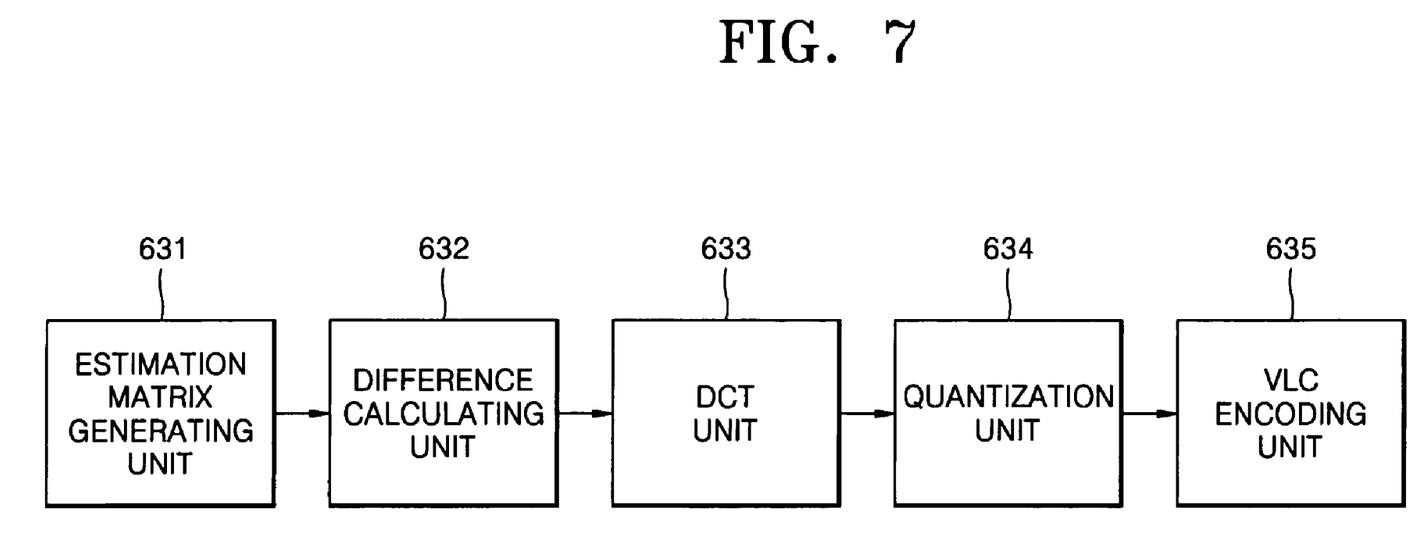
FIG. 7 is a schematic diagram of an encoding unit illustrated in FIG. 6.

In FIG. 7, a schematic structure of the encoding unit 630 illustrated in FIG. 6 is described.

The encoding unit 630 includes an estimation matrix generating unit 631, a difference calculating unit 632, a DCT unit 633, a quantizing unit 634, and a VLC encoding unit 635.

The estimation matrix generating unit 631 obtains an estimation matrix from references for motion estimation. The difference calculating unit 632 calculates the difference between a basic encoding unit selected by the encoding determination unit 620 and the estimation matrix obtained by the estimation matrix generating unit 631. The DCT unit 633 performs DCT on the output of the difference calculating unit 632. The quantizing unit 634 quantizes the result output from the DCT unit 633, and the VLC encoding unit 635 scans the quantized result and performs VLC encoding.

Figure 8:
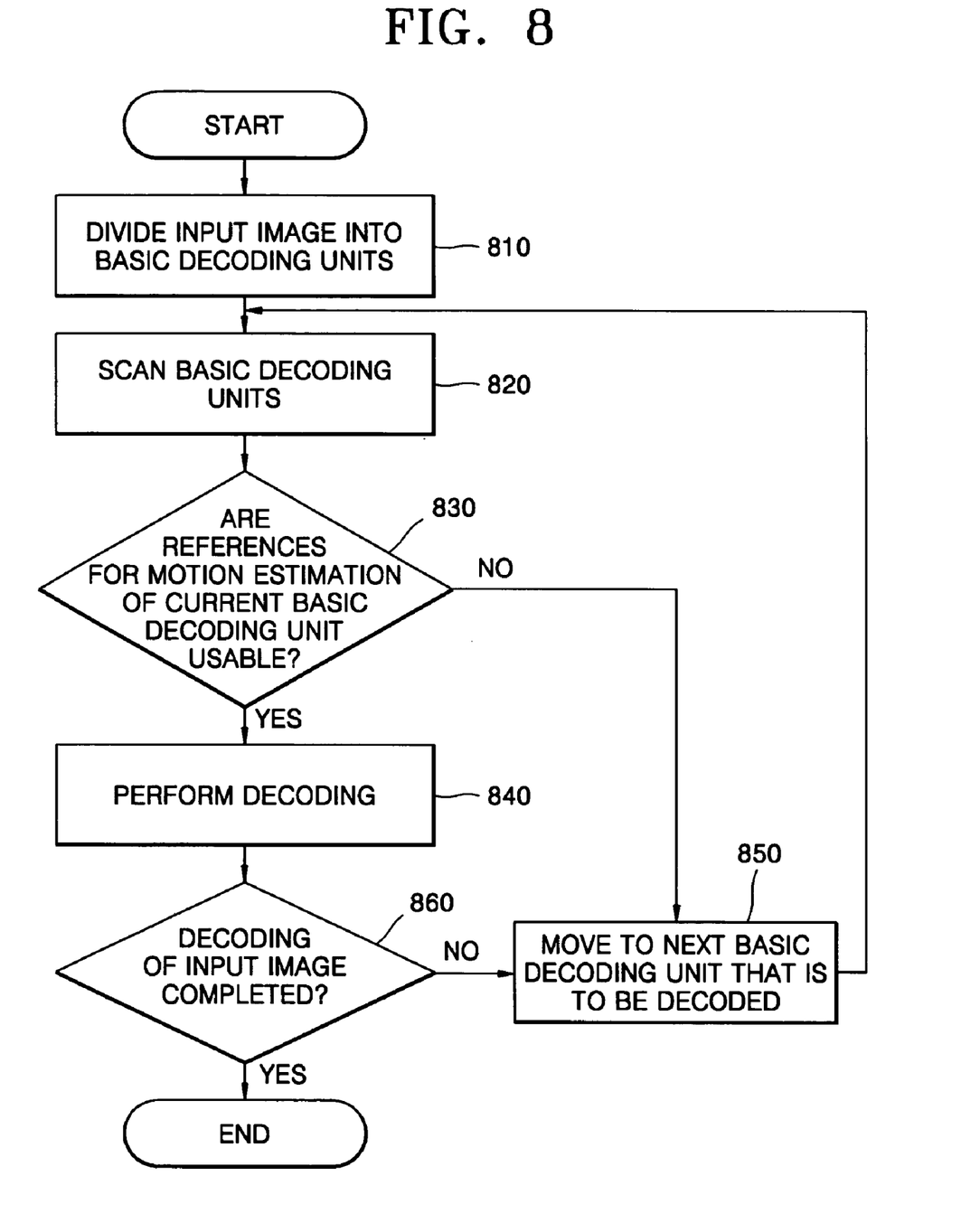
FIG. 8 is a flow chart illustrating a decoding order in the inter mode based on the multi-scan according to an embodiment of the present invention.

FIG. 8 is a flow chart illustrating a decoding order in the inter mode based on the multi-scan method according to an embodiment of the present invention.

First, in operation 810, an input image is divided into basic decoding units composed of predetermined sized blocks. Here, the basic decoding units composed of the predetermined sized blocks may be 16×16 MBs or another MBs of M×N form (M>1, N>1, wherein M and N are integers).

Then, in operation 820, at least one of the basic decoding units is scanned. In the present embodiment, raster scanning, which is a general scanning method, is adopted. Raster scanning scans from left to right, and from top to bottom.

Then, in operation 830, it is determined whether references for motion estimation of the current basic decoding unit can be used for a reference to decode the current basic decoding unit.

The references for motion estimation use blocks that are decoded before the final scanning of a decoded previous frame or the current frame.

In operation 830, if the result of the determination indicates that the references for motion estimation of the current basic decoding unit can be used as the reference to decode the current basic decoding unit, decoding is performed in operation 840.

If the references for motion estimation of the current basic decoding unit cannot be used as the reference to decode the current basic decoding unit, decoding is not performed on the current basic decoding unit and the decoding moves on to the next basic decoding unit in operation 850. Then, the process moves on to operation 820 which scans the basic decoding units. The decoding process of operation 840 will be described in more detail with reference to FIG. 9.

After performing decoding in operation 840, it is determined whether decoding of the input image is completed in operation 860.

If the determination result indicates that the decoding of the input image is completed, the decoding process is terminated, but if the decoding of the input image is not completed, the process moves on to operation 850 and then starts the process from operation 820.

Figure 9:
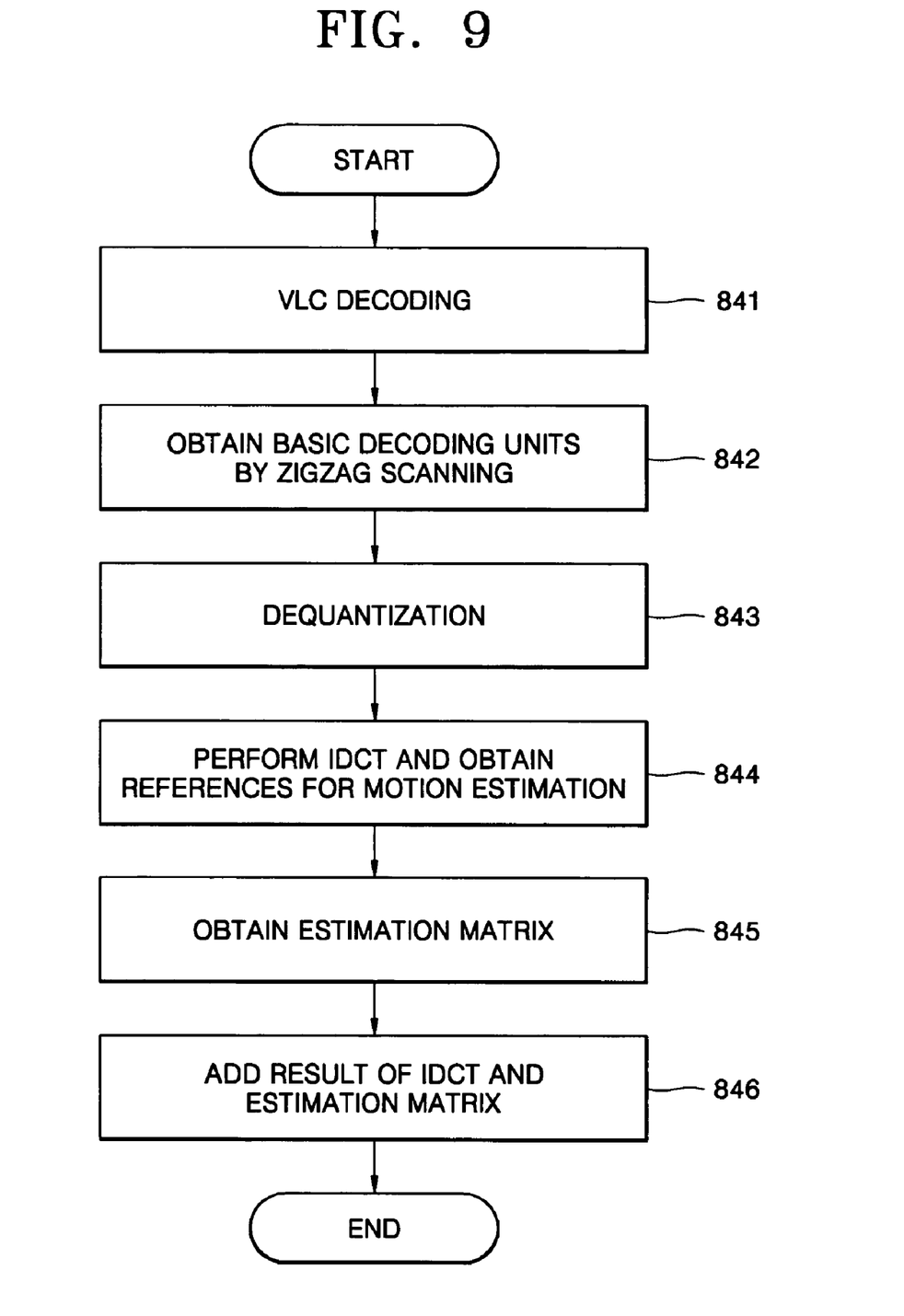
FIG. 9 is a detailed flow chart illustrating a decoding operation described in FIG. 8.

FIG. 9 is a detailed flow chart illustrating the decoding operation of operation 840 described in FIG. 8.

In operation 842, after performing VLC decoding in operation 841, the basic decoding units are obtained by zigzag scanning.

Then, in operation 843, the obtained basic decoding units are dequantized. In operation 844, inverse DCT (IDCT) is performed on the result of dequantization to obtain the reference for motion estimation.

Through operation 844, an estimation matrix is obtained from the references for motion estimation in operation 845.

Then, in operation 846, the result of IDCT and the estimation matrix are added together. As a result, decoded blocks are obtained.

Figure 10:
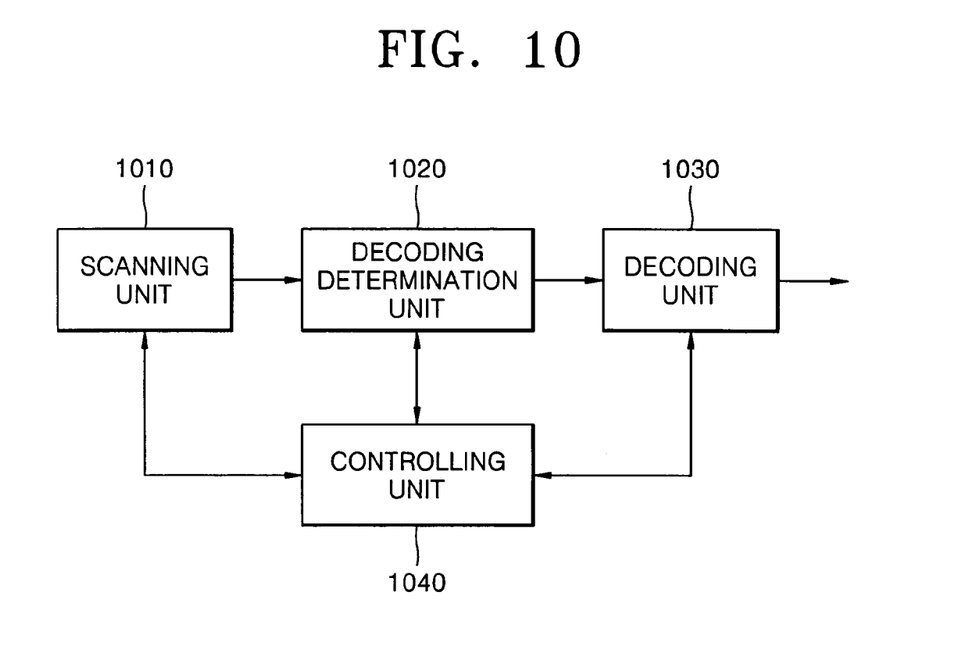
FIG. 10 is a schematic diagram of a decoder to perform decoding in the inter mode based on the multi-scan according to an embodiment of the present invention.

FIG. 10 is a schematic diagram of a decoder to perform decoding in the inter mode based on the multi-scan method according to an embodiment of the present invention.

The decoder includes a scanning unit 1010, a decoding determination unit 1020, a decoding unit 1030, and a controlling unit 1040.

The scanning unit 1010 divides an input image into basic decoding units composed of predetermined sized blocks and scans at least one of the basic decoding units.

The decoding determination unit 1020 determines whether references for motion estimation of the basic decoding units scanned by the scanning unit 1010 can be used as references to decode the basic decoding units.

The decoding unit 1030 selectively decodes the input image according to the determination result of the decoding determination unit 1020, and the controlling unit 1040 controls the operations of the scanning unit 1010, the decoding determination unit 1020, and the decoding unit 1030.

Also, the controlling unit 1040 operates the scanning unit 1010, the decoding determination unit 120, and the decoding unit 1030 until decoding of the input image is completed.

The references for motion estimation use the blocks that are decoded before the final scanning of the decoded previous frame or the current frame.

Figure 11:
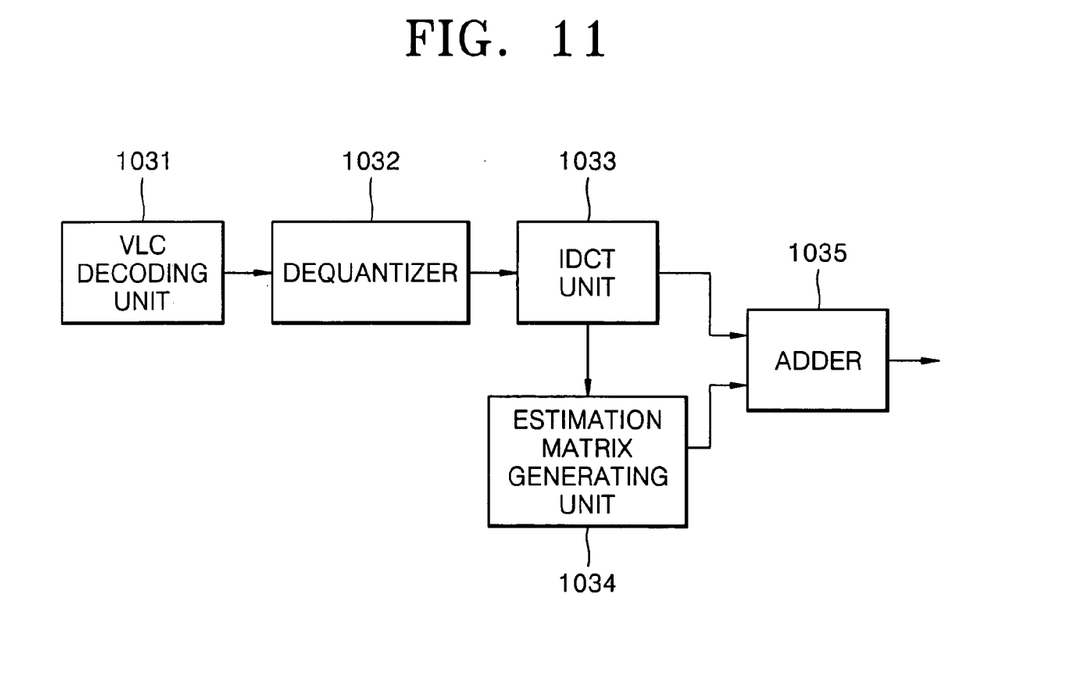
FIG. 11 is a schematic diagram of a decoding unit illustrated in FIG. 10.

FIG. 11 is a schematic diagram of the decoding unit 1030 illustrated in FIG. 10.

In FIG. 11, the decoding unit 1030 includes a VLC decoding unit 1031, a dequantizer 1032, an IDCT unit 1033, an estimation matrix generating unit 1034, and an adder 1035.

The VLC decoding unit 1031 obtains the basic decoding units by VLC decoding and scanning the input image. The dequantizer 1032 dequantizes the obtained basic decoding units. The IDCT unit 1033 performs IDCT on the result of dequantization to obtain references for motion estimation. The estimation matrix generating unit 1034 obtains an estimation matrix from the reference for motion estimation. The adder 1035 adds the output from the IDCT unit 1033 and the estimation matrix to obtain decoded blocks.

Figure 12A:
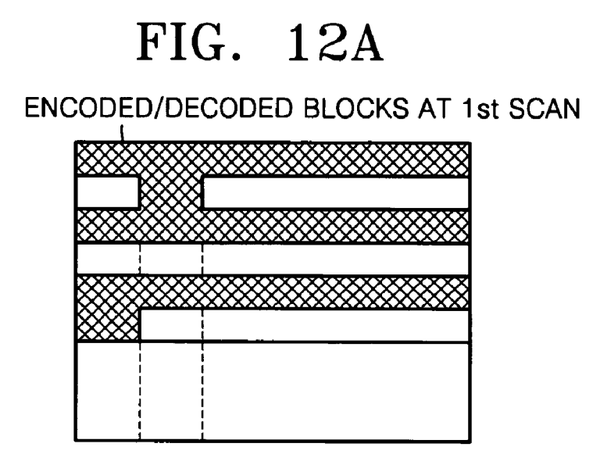
FIGS. 12A through 12C are views illustrating an encoding/decoding order in the inter mode based on the multi-scan according to an embodiment of the present invention.
Figure 12B:
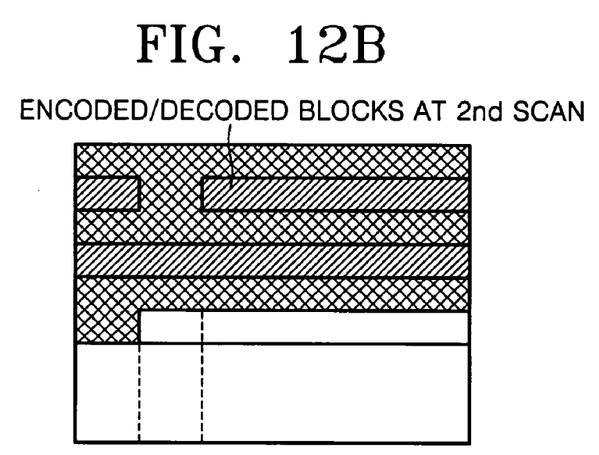
Figure 12C:
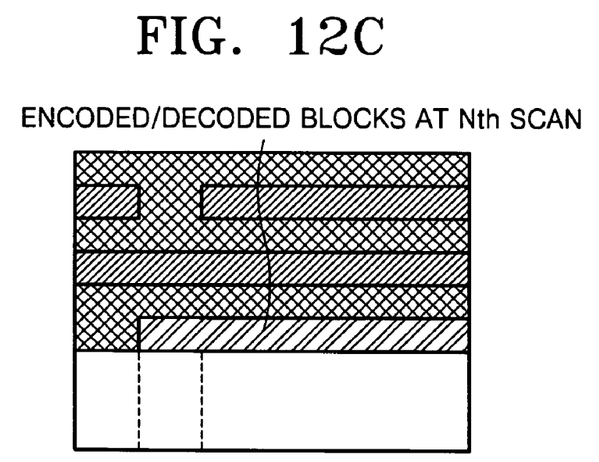

FIGS. 12A through 12C are views illustrating an encoding/decoding order in the inter mode based on the multi-scan method according to an embodiment of the present invention.

FIG. 12A is a view of encoded/decoded blocks at the first scan, FIG. 12B is a view of the encoded/decoded blocks at the second scan, and FIG. 12C is a view of the encoded/decoded blocks at the $n^{th}$ scan.

As described above, the present invention does not encode/decode an input image through a single scan but through multiple scans ($n^{th}$ scan in the present embodiment). Such an encoding/decoding order is only an example to help illustrate the present invention, and is not limited to the example mentioned herein.

Figure 13:
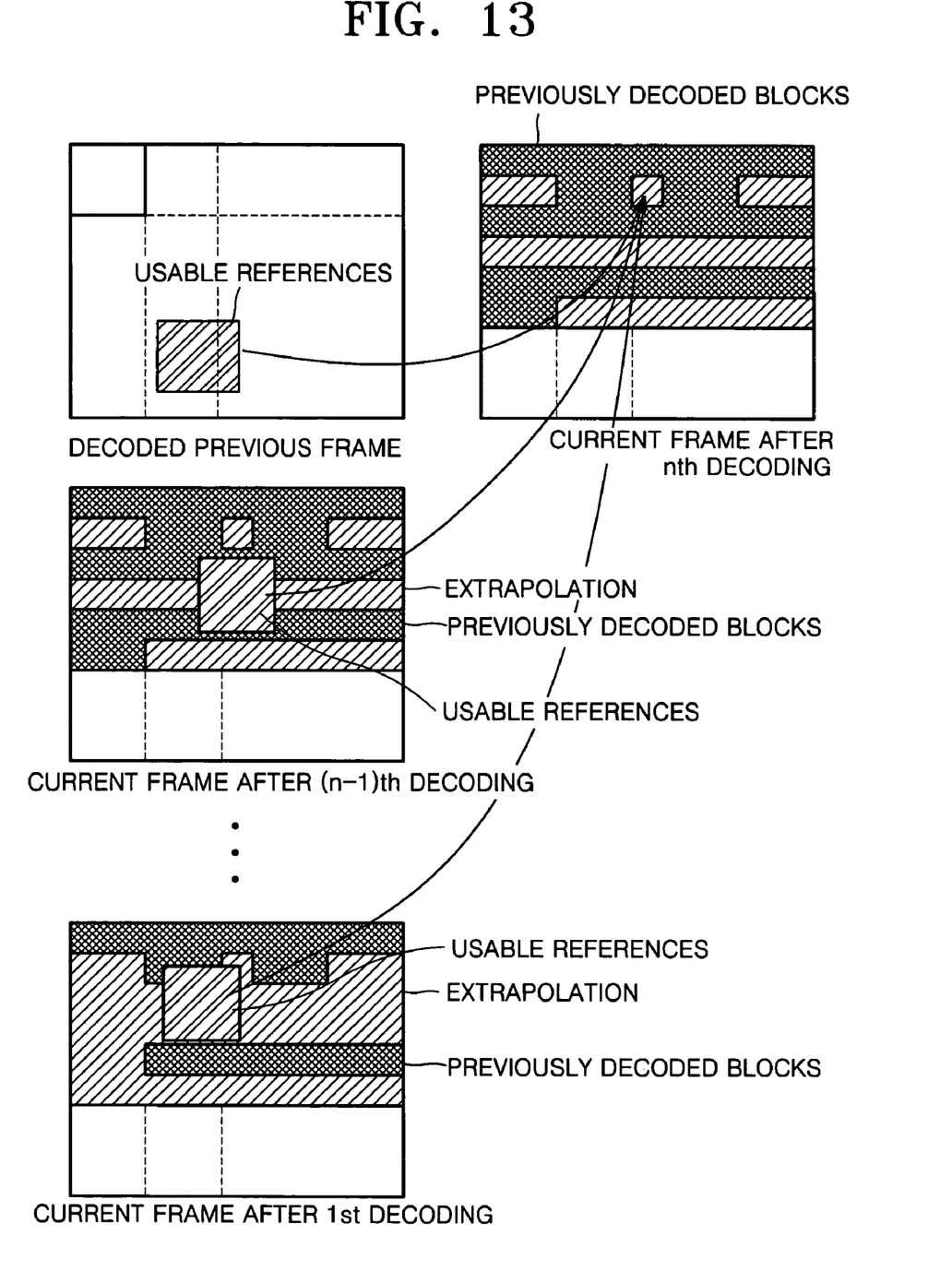
FIG. 13 is a view of an exemplary result when performing encoding/decoding in an $n^{th}$ scan in the inter mode based on the multiple scanning according to an embodiment of the present invention.

FIG. 13 is a view of an exemplary result when performing encoding/decoding in an $n^{th}$ scan in the inter mode based on the multiple scans according to an embodiment of the present invention.

References that can be used for motion estimation when encoding/decoding at the $n^{th}$ scan in the inter mode illustrated in FIG. 13 are as follows: (1) Decoded previous frame, (2) an extrapolated image of the current frame in the $1^{st}$ scan time, and (3) a decoded block of the current frame after performing decoding on the current frame in the $(n-1)^{th}$ time. The references presented in FIG. 13 are only some examples of references that can be used for motion estimation, and thus the present invention is not limited to the above-mentioned examples.

Figure 14:
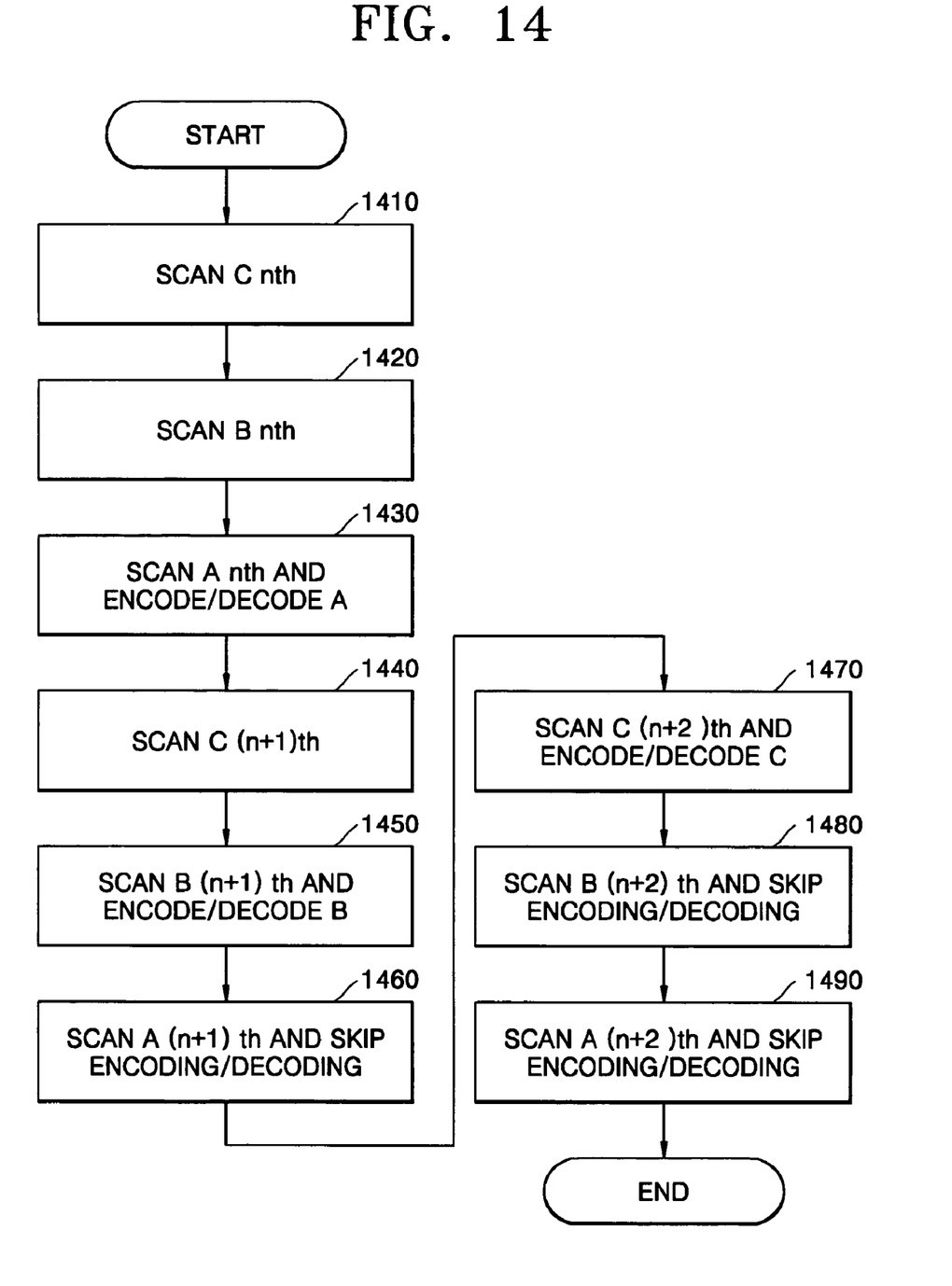
FIG. 14 is a flow chart illustrating an encoding/decoding order in an inter mode based on a multiple scanning according to another embodiment of the present invention.

FIG. 14 is a flow chart illustrating an encoding/decoding order in an inter mode based on a multiple scanning according to another embodiment of the present invention.

It is assumed that there are three blocks, A, B, and C, within a frame, and B needs information on A and C needs information on A and B.

In operation 1410, at an $n^{th}$ scan time, C is first to be scanned but it is not re-structured. This is because A and B are not encoded/decoded.

In operation 1420, B is scanned next, but C still cannot be encoded/decoded.

Then, in operation 1430, A is the last block to be scanned at the $n^{th}$ scan time, and if it is assumed that information which A depends on is encoded/decoded in the previous scan, A can be encoded/decoded.

In operation 1440, at an $(n+1)^{th}$ scan time, although C is still the first block to be scanned, it cannot be re-structured since B is not encoded/decoded.

In operation 1450, B is scanned next and can be encoded/decoded at the present time because A is encoded/decoded.

In operation 1460, A is scanned last at the $(n+1)^{th}$ scan time and encoding/decoding is skipped since it is already encoded/decoded.

In operation 1470, At an $(n+2)^{th}$ scan time, C is still the first block to be scanned and can be encoded/decoded since A and B are encoded/decoded.

In operation 1480, B is scanned next and encoding/decoding thereof is skipped since it is already encoded/decoded.

Then, in operation 1490, A is scanned last at the $(n+2)^{th}$ scan time and encoding/decoding thereof is skipped since it is already encoded/decoded.

As described above, encoding and decoding efficiency of the present invention is improved since spatial relationship is not strictly limited by using an extrapolated image from a decoded previous frame or before the final scan of the current frame as a reference for motion estimation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of encoding in an inter mode based on a multiple scanning, the method comprising:
    dividing an input image into basic encoding units comprising predetermined sized blocks;
    scanning at least one of the basic encoding units;
    determining whether references for motion estimation of a current basic encoding unit can be used as references to encode the current basic encoding unit; and
    selectively encoding the current basic encoding unit according to a result of the determination, wherein the selectively encoding comprises,
    encoding the current basic encoding unit based on the references if the references for motion estimation can be used as the references to encode the current basic encoding unit, and
    not encoding the current basic encoding unit and moving on to a next basic encoding unit that is to be encoded if the references for motion estimation cannot be used as the references to encode the current basic encoding unit.

2. The method of claim 1, wherein from the scanning of the at least one of the basic encoding units to the selective encoding of the current basic encoding unit are repeated until encoding of the input image is completed.

3. The method of claim 1, wherein the encoding of the current basic encoding unit based on the references comprises:
    obtaining an estimation matrix from the references for motion estimation;
    performing DCT (discrete cosine transform) on a difference between the current encoding unit that is to be encoded and the obtained estimation matrix;
    obtaining DCT conversion coefficients by performing dequantization on a result of DCT; and
    encoding the current basic encoding unit using the DCT conversion coefficients.

4. The method of claim 3, wherein the DCT conversion coefficients are scanned in a zigzag fashion and encoded using a VLC (variable length coding) method.

5. The method of claim 1, wherein a decoded previous frame or blocks decoded before a final scanning of a current frame is used as the references for motion estimation.

6. The method of claim 1, wherein the basic encoding units comprising the predetermined sized blocks are macroblocks or M×N matrixes.

7. A non-transitory computer readable recording medium having a program recorded thereon for executing the method described in claim 1.

8. A method of decoding in an inter mode based on a multiple scanning, the method comprising:
    dividing an input image into basic decoding units comprising predetermined sized blocks;
    scanning at least one of the basic decoding units;
    determining whether references for motion estimation of a current basic decoding unit can be used as references to decode the current basic decoding unit; and
    selectively decoding the current basic decoding unit according to a result of the determination, wherein the selectively decoding comprises,
    decoding the current basic decoding unit based on the references if the references for motion estimation can be used as the references to decode the current basic decoding unit, and
    not decoding the current basic decoding unit and moving on to a next basic decoding unit that is to be decoded if the references for motion estimation cannot be used as the references to decode the current basic decoding unit.

9. The method of claim 8, wherein from the scanning of the at least one of the basic decoding units to the selective decoding of the current basic decoding unit are repeated until decoding of the input image is completed.

10. The method of claim 8, wherein the decoding of the current basic decoding unit based on the references comprises:
    obtaining the basic decoding units through decoding and scanning the input image;
    dequantizing the obtained basic decoding units;
    obtaining references for motion estimation by performing IDCT (inverse DCT) on a result of the dequantization;
    obtaining an estimation matrix from the obtained references for motion estimation; and
    adding the result of the IDCT and the estimation matrix to obtain a decoded block.

11. The method of claim 10, wherein the basic decoding units are decoded using a VLC method and obtained using zigzag scanning in the obtaining of the basic decoding units.

12. The method of claim 8, wherein a decoded previous frame or blocks decoded before a final scanning of a current frame is used as the references for motion estimation.

13. The method of claim 8, wherein the basic decoding units comprising the predetermined sized blocks are macroblocks or M×N matrixes.

14. A non-transitory computer readable recording medium having a program recorded thereon for executing the method described in claim 8.

15. An encoder in an inter mode based on a multiple scanning comprising:
    a scanning unit to divide an input image into basic encoding units comprising predetermined sized blocks and scanning at least one of the basic encoding units;
    an encoding determination unit to determine whether references for motion estimation of the basic encoding units scanned by the scanning unit can be used as references to encode the basic encoding units;

an encoding unit to selectively encode the basic encoding units according to a result of the determination of the encoding determination unit, wherein the selective encoding by the encoding unit comprises, encoding the basic encoding unit based on the references if the references for motion estimation can be used as the references to encode the basic encoding unit, and not encoding the basic encoding unit and moving on to a next basic encoding unit that is to be encoded if the references for motion estimation cannot be used as the references to encode the basic encoding unit; and a controlling unit to control operations of the scanning unit, the encoding determination unit, and the encoding unit.

16. The encoder of claim 15, wherein the encoding unit comprises:

an estimation matrix generating unit to obtain an estimation matrix from the references for motion estimation;

a difference calculating unit to calculate a difference between a basic encoding unit selected by the encoding determination unit and the estimation matrix obtained from the estimation matrix generating unit;

a DCT unit to perform DCT on an output of the difference calculating unit;

a quantization unit to quantize a result output from the DCT unit; and a VLC encoding unit to scan and perform VLC encoding on a result of quantization.

17. The encoder of claim 15, wherein the controlling unit operates the scanning unit, the encoding determination unit, and the encoding unit until encoding of the input image is completed.

18. The encoder of claim 15, wherein a decoded previous frame or blocks decoded before a final scanning of a current frame is used as the references for motion estimation.

19. The encoder of claim 15, wherein the basic encoding units comprising the predetermined sized blocks are macroblocks or M×N matrixes.

20. A decoder in an inter mode based on a multiple scanning comprising:

a scanning unit to divide an input image into basic decoding units comprising predetermined sized blocks and scanning at least one of the basic decoding units;

a decoding determination unit to determine whether references for motion estimation of the basic decoding units scanned by the scanning unit can be used as references to decode the basic decoding units;

a decoding unit to selectively decode the basic decoding units according to a result of the determination of the decoding determination unit, wherein the selective decoding by the decoding unit comprises, decoding the basic decoding unit based on the references if the references for motion estimation can be used as the references to decode the basic decoding unit, and not decoding the basic decoding unit and moving on to a next basic decoding unit that is to be decoded if the references for motion estimation cannot be used as the references to decode the basic decoding unit; and a controlling unit to control operations of the scanning unit, the decoding determination unit, and the decoding unit.

21. The decoder of claim 20, wherein the decoding unit comprises:

a VLC decoding unit to obtain the basic decoding units through VLC decoding and scanning the input image;

a dequantizer to dequantize the obtained basic decoding units;

an IDCT unit to perform IDCT to obtain the references for motion estimation;

an estimation matrix generating unit to obtain an estimation matrix from the references for motion estimation; and an adder to add an output of the IDCT unit and the estimation matrix.

22. The decoder of claim 20, wherein the controlling unit operates the scanning unit, the decoding determination unit, and the decoding unit until decoding of the input image is completed.

23. The decoder of claim 20, wherein a decoded previous frame or blocks decoded before a final scanning of a current frame is used as the references for motion estimation.

24. The decoder of claim 20, wherein the basic decoding units comprising the predetermined sized blocks are macroblocks or M×N matrixes.

25. A method of encoding in an inter mode based on multiple scanning, the method comprising:

dividing an input image into basic encoding units comprising predetermined sized blocks;

scanning at least one of the basic encoding units;

determining whether references for motion estimation of a current basic encoding unit can be used as references to encode the current basic encoding unit; and encoding the current basic encoding unit based on the references if the references for motion estimation can be used as the references to encode the current basic encoding unit and otherwise not encoding the current basic encoding unit and moving on to a next basic encoding unit that is to be encoded.

* * * * *